United States Patent [19]
Grace

[11] Patent Number: 4,950,356
[45] Date of Patent: Aug. 21, 1990

[54] METHOD OF AND APPARATUS FOR LINING PIPES

[75] Inventor: John C. Grace, Prestbury, United Kingdom

[73] Assignee: Tate Pipe Lining Processes Limited, Manchester, England

[21] Appl. No.: 368,369

[22] PCT Filed: Dec. 3, 1987

[86] PCT No.: PCT/GB87/00869
§ 371 Date: Jun. 1, 1989
§ 102(e) Date: Jun. 1, 1989

[87] PCT Pub. No.: WO88/04387
PCT Pub. Date: Jun. 16, 1988

[30] Foreign Application Priority Data
Dec. 6, 1986 [GB] United Kingdom ............... 8629217

[51] Int. Cl.$^5$ ............................................. B29C 63/34
[52] U.S. Cl. .................................. 156/259; 118/105;
118/306; 118/DIG. 10; 156/294; 156/330;
156/331.7; 156/391; 156/423; 156/577;
156/575; 156/578; 264/270; 264/311; 425/262;
425/460; 138/97; 138/DIG. 7

[58] Field of Search .................. 264/36, 269, 270, 309,
264/310, 311; 425/262, 460, 13; 156/287, 294,
330, 391, 423, 575, 577, 578, 576, 259, 331.7;
118/105, 306, DIG. 10; 138/97, 98, DIG. 7

[56] References Cited

U.S. PATENT DOCUMENTS

| | | | |
|---|---|---|---|
| 2,204,785 | 6/1940 | Bennett | 264/312 |
| 2,851,061 | 9/1958 | Bernard et al. | 118/105 |
| 3,004,278 | 10/1961 | Stanley | 118/DIG. 10 |
| 3,333,311 | 8/1967 | Matheny et al. | 118/306 |
| 3,908,799 | 9/1975 | Valeriano | 118/DIG. 10 |
| 3,960,644 | 6/1976 | McFadden | 156/390 |
| 3,966,389 | 6/1976 | Shubert | 425/460 |
| 4,216,738 | 8/1980 | Muta | 118/72 |
| 4,252,763 | 2/1981 | Padgett | 264/133 |
| 4,273,605 | 6/1981 | Ross | 156/294 |
| 4,325,772 | 4/1932 | Suetoshi et al. | 156/294 |
| 4,401,696 | 8/1983 | Wood | 427/236 |
| 4,427,480 | 1/1984 | Kamuro et al. | 156/287 |
| 4,602,974 | 7/1986 | Wood et al. | 156/287 |
| 4,724,108 | 2/1988 | Jurgenlohmann et al. | 264/36 |
| 4,741,795 | 5/1988 | Grace et al. | 156/247 |
| 4,810,453 | 3/1989 | Clarke et al. | 264/36 |

FOREIGN PATENT DOCUMENTS

| | | |
|---|---|---|
| 226036 | 6/1987 | European Pat. Off. |
| 1512035 | 5/1978 | United Kingdom |
| 2082285 | 3/1982 | United Kingdom |
| 1352829 | 5/1984 | United Kingdom |

Primary Examiner—Jan H. Silbaugh
Assistant Examiner—Mathieu Vargot
Attorney, Agent, or Firm—Nixon & Vanderhye

[57] ABSTRACT

A method of lining a pipe comprises the steps of laying hose means along the bottom of a pipe to be lined, the hose means having been filled with a predetermined quantity of settable lining composition, anchoring the hose means at each end along the bottom of the pipe, advancing a centrifugal lining machine along the length of the hose means, slitting the hose means in front of the advancing centrifugal lining machine to permit egress of the lining composition from the hose means, and delivering the admixed settable composition to a centrifugal impellor of the centrifugal lining machine for application of the settable composition to the pipe wall as the centrifugal lining machine advances along the pipe. The method is characterised by the step of guiding the slit and emptied hose means through an axial bore in the centrifugal lining machine to lie in a flattened condition on the bottom of the lined pipe wall rearwardly of the centrifugal lining machine.

10 Claims, 6 Drawing Sheets

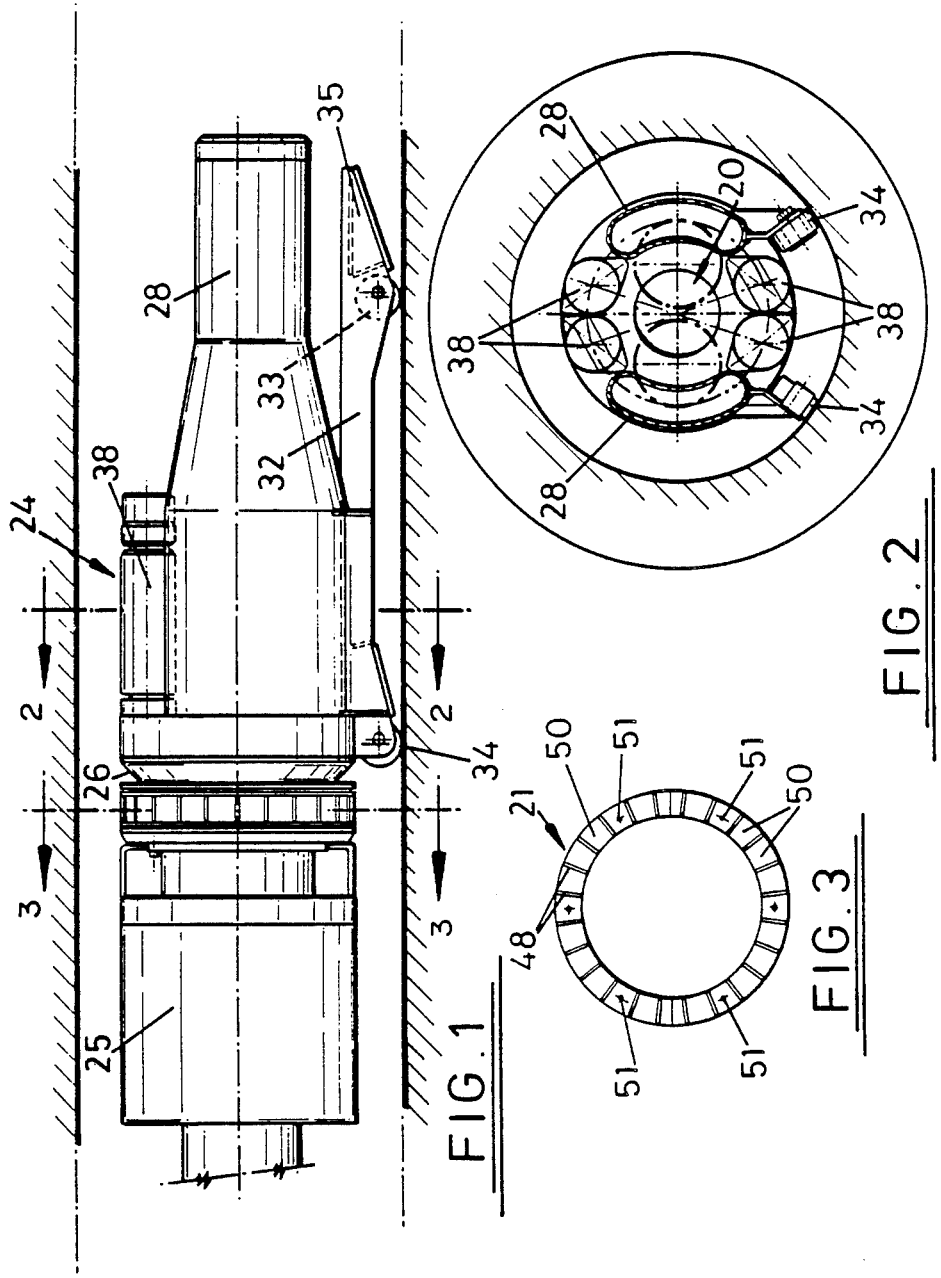

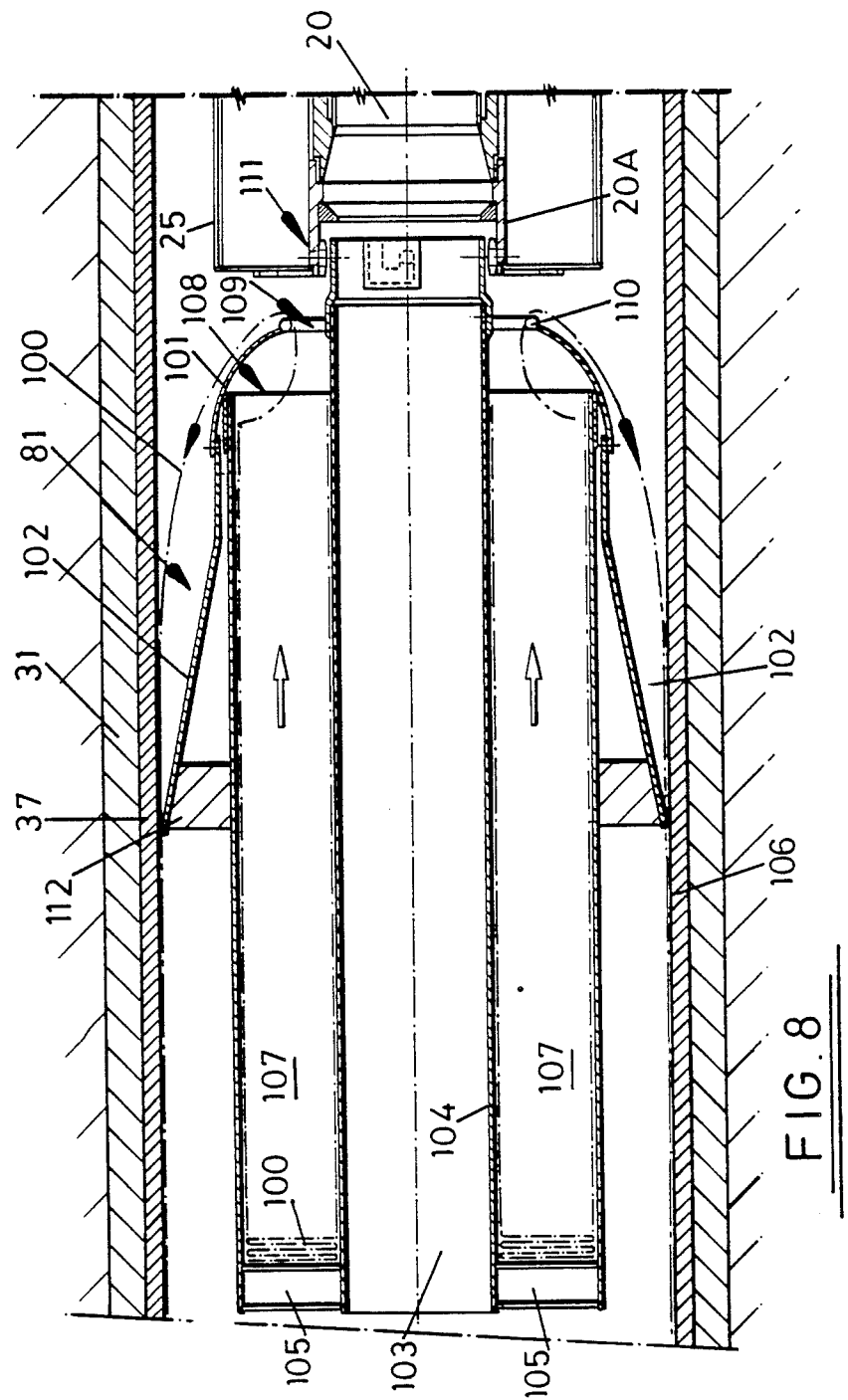

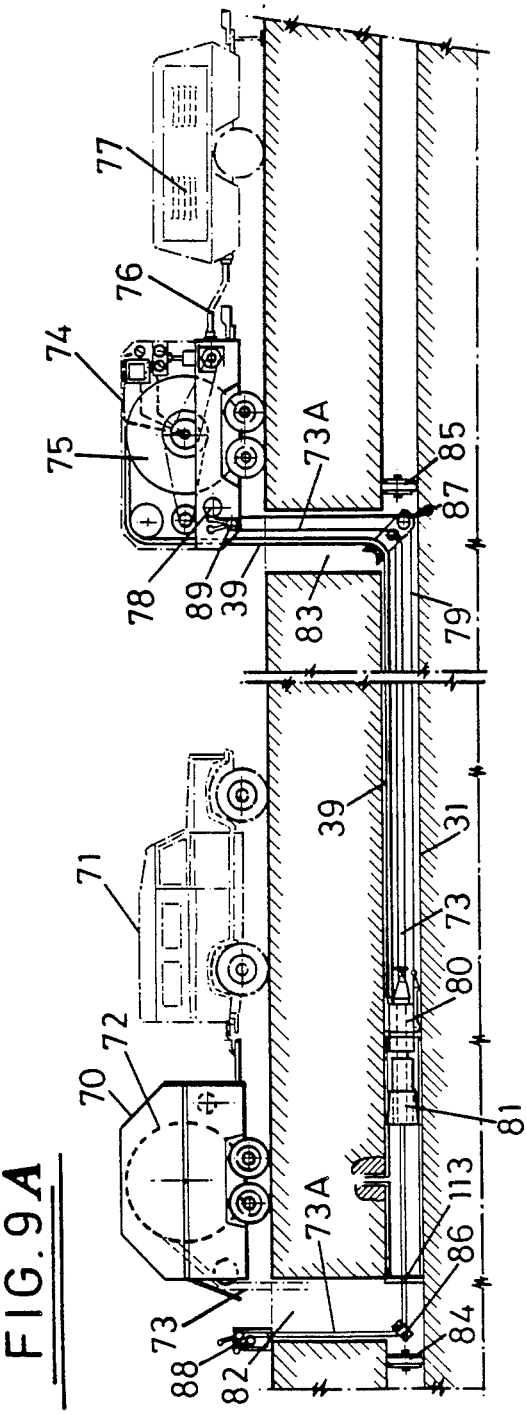
FIG.9A
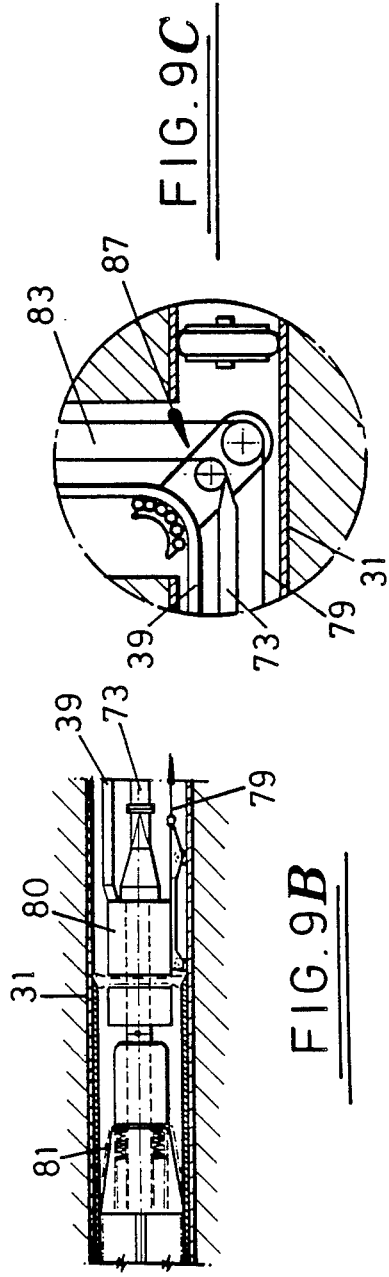
FIG.9B
FIG.9C

METHOD OF AND APPARATUS FOR LINING PIPES

This invention relates to a method of and apparatus for lining pipes, especially but not exclusively sewer or gas pipes.

The invention is concerned with improvements in or modifications of the pipe lining methods and apparatus disclosed in our PCT Pat. Application No. PCT/GB86/00486 filed 14th Aug. 1986 (Publication No. WO87/01173).

Like the invention disclosed in our aforesaid published Patent Application:

(1) The present invention is particularly concerned with the relining of existing sewers, especially but not exclusively such sewers having a diameter within the range of 9 inches to 24 inches (23 cms. to 61 cms.).

(2) The lining composition used with the present invention is preferably a settable, two-component resin based structural lining material consisting of a resin and a curing or hardening agent.

The resin is preferably an epoxy resin but may alternatively be a polyurethane, or other organic coating or lining materials.

The curing or hardening agent and/or the resin may contain inorganic fillers.

The preferred lining composition is a settable two-component epoxy resin-based one containing inorganic fillers.

(3) For convenience the term "pipe" is used herein and in the claims, save for the description with reference to the drawings which is concerned particularly with lining sewers, but it is clearly to be understood that the term "pipe" includes within its scope sewers, other underground excavations and, in general, any linear hole or passage capable of being lined by the method and apparatus of the present invention.

In our aforesaid published Patent Application there is disclosed a method of lining a pipe comprising the steps of laying along the pipe hose means filled with a predetermined quantity of settable lining composition to be applied against the pipe wall; advancing a centrifugal lining machine along the length of the hose means; axially slitting the hose means in front of the advancing centrifugal lining machine to permit egress of the lining composition from the hose means; and guiding the egressing lining composition into the centrifugal lining machine for application to the pipe wall as it advances along the hose means.

Also disclosed in our aforesaid published Patent Application is apparatus for lining a pipe with a settable lining composition contained in hose means laid along the pipe, the apparatus being adapted to be advanced through the pipe and comprising a centrifugal lining machine having inlet means for the settable lining composition, delivery tube means connected, at one end, to the inlet means and adapted, at the other end, for insertion into the hose means filled with the settable lining composition, and hose-slitting means at or adjacent the other end of the delivery tube means for axially slitting the hose means as the delivery tube means is urged into the hose means, whereby the settable lining composition can flow from the hose means into the delivery tube means and thence to the centrifugal lining machine.

Essential features of our aforesaid published Patent Application and also, it is to be noted, of the present invention are the laying of hose means filled with settable lining composition along the bottom of a pipe to be lined, and the advancement of a lining apparatus along the hose means, which apparatus axially slits the hose means, collects the settable lining composition from the hose means and feeds it to a centrifugal lining machine, which is a part of the apparatus, which centrifugally sprays or throws the settable lining composition onto the pipe wall to line same.

It is preferred to employ two hoses laid in parallel side-by-side relationship, one containing the resin and the other containing the curing or hardening agent (with or without inorganic fillers), and the hoses equalling in length, or substantially so, the length of pipe to be lined. The volumetric capacity of each hose is preferably such as to provide the quantity of resin and hardener sufficient to give a predetermined thickness of structural lining on the pipe wall. Such a thickness may, for example, be within the range of 1% to 5% of the pipe diameter.

Also disclosed in our aforesaid published Patent Application is a trowelling or smoothing method which employs as a trowelling medium a flexible thin-walled tube applied under pressure against the structurally-lined pipe wall, prior to setting or curing of settable lining composition, to remove any orange peel effect from the structural lining. This trowelling tube, which may be a cellulose polymer such as CELLOPHANE (Trade Mark), may be removed or simply left in situ.

The present invention is also concerned with improvements in or modifications of this trowelling method and the trowelling arrangement for effecting same.

According to the present invention there is provided a method of lining a pipe comprising the steps of laying hose means along the bottom of a pipe to be lined, the hose means having been filled with a predetermined quantity of settable lining composition, anchoring the hose means at each end along the bottom of the pipe, advancing a centrifugal lining machine along the length of the hose means, slitting the hose means in front of the advancing centrifugal lining machine to permit egress of the lining composition from the hose means, delivering the admixed settable composition to a centrifugal impellor of the centrifugal lining machine for application of the settable composition to the pipe wall as the centrifugal lining machine advances along the pipe, and guiding the slit and emptied hose means through an axial bore in the centrifugal lining machine to lie in a flattened condition on the bottom of the lined pipe wall rearwardly of the centrifugal lining machine.

Preferably, the method comprises the step of trowelling or smoothing the applied lining composition by means of a tube of flexible thin-walled material housed in open tube manner in an annular housing surrounding an axial bore of a smoothing trowel trailed behind the centrifugal lining machine in terms of lining machine advancement, the two axial bores being aligned, and the trowelling action being effected by anchoring one end of the tube of flexible thin-walled material within the pipe at a location constituting a starting point for a pipe-lining run, advancing the centrifugal lining machine and smoothing trowel along the pipe to cause extraction of the flexible thin-walled tube through an open end of the annular housing adjacent the lining machine for movement around and rearwardly of the smoothing trowel which applies the flexible thin-walled tube under pressure against the applied lining composition rearwardly of the lining machine.

Also according to the present invention there is provided apparatus for lining a pipe with a settable lining composition contained in hose means laid along the pipe, the apparatus being adapted to be advanced through the pipe and comprising a centrifugal lining machine having an axial bore extending the length thereof, inlet means for the settable lining composition, delivery tube means connected, at one end, to the inlet means and adapted, at the other end, for insertion into the hose means filled with the settable lining composition, and hose-slitting means at or adjacent the other end of the delivery tube means for axially slitting the hose means as the delivery tube means is urged into the hose means, whereby the settable lining composition can flow from the hose means into the delivery tube means and thence to the centrifugal lining machine, while the slit and emptied hoses pass through the axial bore to be disposed on the now-lined wall of the pipe.

Preferably the delivery tube means comprises a pair of delivery tubes, each for a respective component constituent of a two-shot resinous settable lining composition, communicating with a mixing chamber containing a rotatable mixing and agitating arrangement, which chamber, in turn, communicates with a centrifugal impellor of the centrifugal lining machine, the mixing and agitating arrangement and the centrifugal impellor being rotated in opposite directions at different speeds by separate driving means.

Preferably the centrifugal impellor is driven at a relatively high speed while the mixing and agitating arrangement is driven at a relatively low speed.

Preferably the driving means, in each case, is a plurality of air vane motors coupled to the centrifugal impellor and the mixing and agitating arrangement respectively via gearing, the respective air vane motors being at opposite ends of the centrifugal lining machine.

Preferably, the motive air pressure is fed to the air vane motors of the mixing and agitating arrangement via an air delivery hose or pipe and an annular distribution chamber which communicates with an axial annular chamber to deliver pressurised air to the air vane motors driving the centrifugal impellor.

Preferably, the exhaust air from the centrifugal impellor air vane motors is returned via an axial annular chamber concentric with the air delivery axial annular chamber for exhaust at the leading end of the centrifugal lining machine.

Preferably, a smoothing trowel is connected to the rear of the lining machine and comprises an axial bore aligned with the axial bore of the lining machine and surrounded by an annular housing for containing in open tube manner a tube of flexible thin-walled material, the annular housing being open at its end nearer the lining machine for egress of the flexible thin-walled tube.

BRIEF DESCRIPTION OF THE DRAWING

An embodiment of the present invention will now be described by way of example with reference to the accompanying drawings, in which:

FIG. 1 is a side elevation of a pipe lining apparatus according to the present invention;

FIG. 2 is a sectional view on the line II—II of FIG. 1;

FIG. 3 is a sectional view on the line III—III of FIG. 1;

FIG. 8 is a sectional view of a trowelling arrangement for use with the lining apparatus of the present invention; and FIG. 9A is a diagrammatic representation of an underground sewer pipe lining operation using the method and apparatus of the present invention, and;

FIG. 9B is an enlarged fragmentary cross-sectional view of the lining machine; and FIG. 9C is an enlarged fragmentary cross-sectional view of the guides for passing the hoses into the pipe.

DESCRIPTION OF THE PREFERRED EMBODIMENTS

Figure 5:
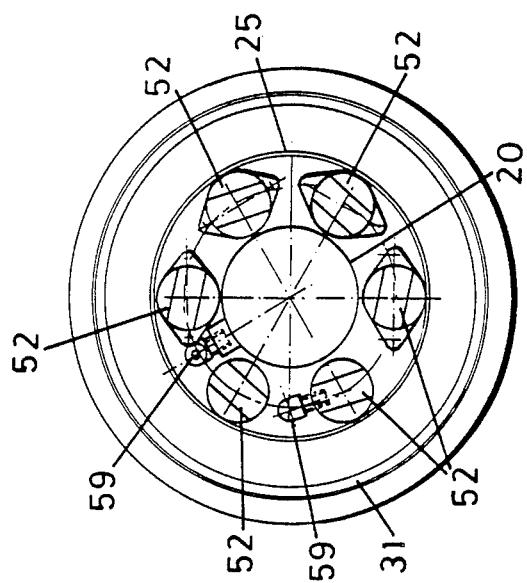
FIG. 5 is an end view from the opposite end of the apparatus.

The apparatus comprises a central open-ended axially extending non-rotatable central tube 20 (FIGS. 6 and 7) which is surrounded by a rotatable centrifugal bladed impellor 21 driven by an air motor arrangement 22 at one end of the apparatus (the trailing end when the apparatus is in use) and a lining composition agitating and mixing arrangement 23 driven by an air motor arrangement 24 at the other end of the apparatus (the leading end when the apparatus is in use).

The air motor arrangement 22 is housed within a stationary surrounding casing 25 and the agitating arrangement 23 is housed within a stationary surrounding casing 26, which casing 26 constitutes the outer wall of a mixing chamber 27 within which the agitating arrangement 23 operates.

As previously indicated the lining composition used with the lining apparatus according to the present invention is constituted by a resin component and a hardener component contained within prefilled plastics hoses which are laid along the length of a sewer pipe to be lined, the hoses being anchored at each end.

The hoses constitute a pair of parallel rails along which the lining apparatus according to the present invention is advanced.

Figure 4:
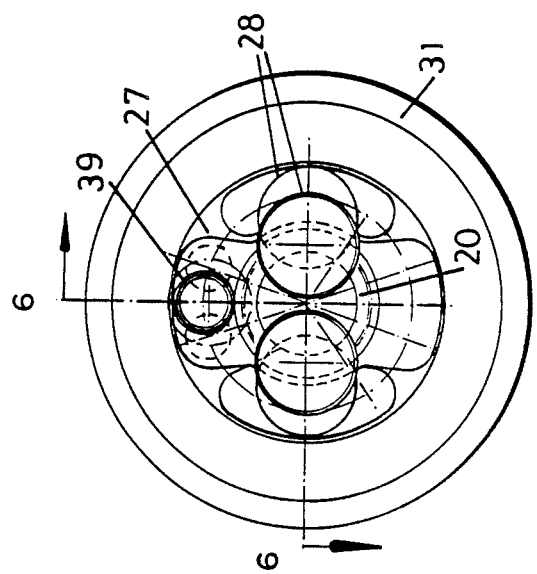
FIG. 4 is an end view of the apparatus disposed within a sewer pipe in the direction of arrows IV—IV of FIG. 6.

The apparatus also comprises two parallel delivery tubes 28 at the leading end of the apparatus in terms of the direction of apparatus advancement along the sewer pipe. These delivery tubes 28 are open at their leading end and are generally of circular cross-section at that end. They extend rearwardly of the apparatus to communicate with the mixing chamber 27, the cross-sectional shape of the delivery tubes 28 changing from circular at the leading end to kidney-shaped as can be seen in FIGS. 2 and 4 to merge with the mixing chamber 27.

Each delivery tube 28 at its outside (see FIG. 6), i.e. the side remote from the central axis of the apparatus, mounts a blade holder 29 which supports a pair of axially spaced removable and replaceable blades 30.

To facilitate movement of the lining apparatus along the sewer pipe 31 it is mounted on a carriage 32 having fore-and-aft wheels 33, 34 which are eccentrically mounted to permit fine tuning of the height of the apparatus relative to the sewer pipe. The carriage 32 extends from the region of the mixing chamber 27 to the leading end of the delivery tubes 28. At the leading end of the carriage there is provided (one at each side) a lateral plate 35 provided with a hole 36 whereby a yoke (not shown) can be attached to the carriage 32. A pulling cable or rope is attached to the yoke at one end and to a powered winch at the other end, the winch being located at ground level and the cable extending from the yoke along the sewer pipe 31 and up the "home" hole or excavation. Operation of the winch advances the lining apparatus at a controlled rate along the sewer pipe 31.

The cutting blades are used, as will be described later, to split the prefilled lining composition hoses to allow the content thereof to flow along the delivery tubes 28 into the mixing chamber 27 whereat the two components (resin and hardener) of the lining composition are intimately and thoroughly mixed prior to flowing into the centrifugal impellor 21 for centrifugal distribution to a predetermined thickness onto the wall of the sewer pipe 31. The applied lining is indicated by the reference 37.

The agitating arrangement 23 and its associated air motor arrangement 24 will now be described in greater detail.

The air motor arrangement 24 comprises four individual air vane motors 38 (see FIG. 2) each of, say, 0.8 horse power capacity giving a total drive input of 3.2 horse power. An air delivery hose 39 is coupled to one of the air motors 38 by a quick-release coupling 40. This air hose 39 like the pulling cable or rope extends along the sewer pipe and up the "home" hole or excavation to the winch which reels in the air hose 39 as the lining apparatus advances towards the "home" hole or excavation. The other end of the air hose 39 is coupled to compressor means at ground level.

Figure 6:
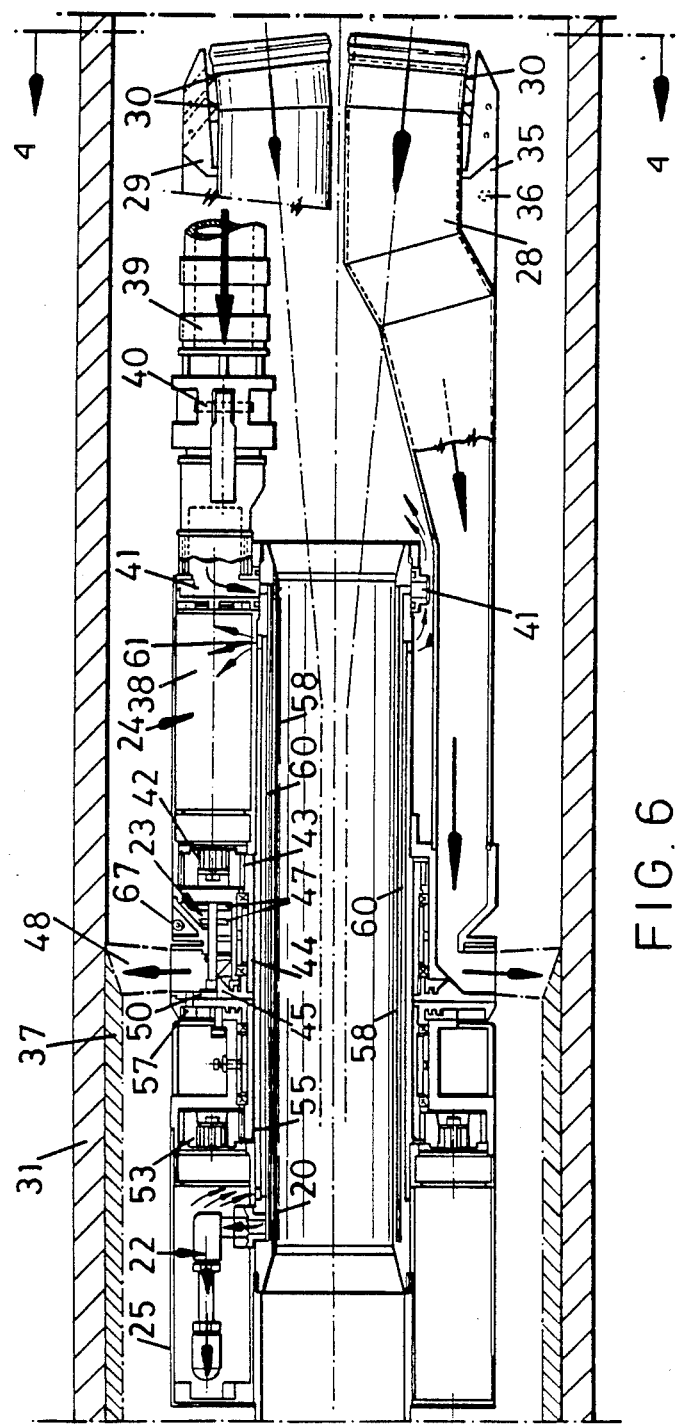
FIG. 6 is a sectional view on the line VI—VI of FIG. 4.
Figure 7:
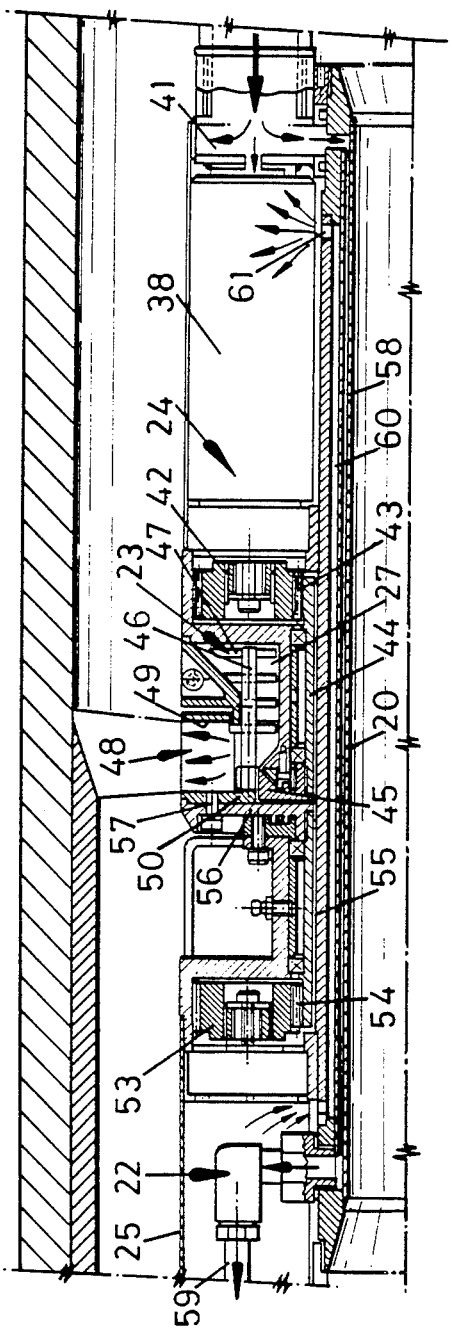
FIG. 7 is a half-sectional view corresponding to the sectional view of FIG. 6 but to an enlarged scale.

The air delivered to said one air motor 38 is fed to the other three air motors 38 via an annular distribution chamber 41 (FIGS. 6 and 7). Each motor drives a gearwheel 42 meshing with a ring gear 43 surrounding the non-rotatable stationary tube 20. This ring gear constitutes part of an annular rotatable hub 44 keyed to a radially extending flange 45 from which extends a series of equi-angularly spaced rods or pins 46 which extend from the flange axially and forwardly of the apparatus into the mixing chamber 27 the rods or pins 46 mounting cross or radial pins 47 which act as agitating or mixing elements within the mixing chamber 27. There are for example six equi-angularly spaced agitator pins 46, 47. The gear ratios 42, 43 are selected such that the agitating and mixing arrangement 23 rotates at say 440 rpm in, for example, an anti-clockwise direction.

Reference will now be made to the centrifugal impellor 21 and its air driving motor arrangement 22.

The centrifugal impellor is diametrically split so that it can be removed from the lining apparatus for cleaning purposes and also if necessary repair and replacement purposes.

It has twentyfour blades 48 each of relatively short radial length. The blades extend between annular flanges 49, 50 with flange 50 being provided with angularly spaced holes 51 to permit the centrifugal impellor to be secured to its driving arrangement.

The air motor driving arrangement 22 comprises six angularly spaced air motors 52. Each air vaned motor 52 drives a gearwheel 53 meshing with a ring gear 54 forming part of an annular rotatable hub 55 to which is keyed a radially extending annular flange 56 to which in turn is bolted the impellor 21 via the flange 50 and bolts 57.

The gear ratios 53, 54 are selected so that the centrifugal impellor 21 is driven at say 3000 rpm in for example a clockwise direction.

It is to be noted that the agitating and mixing arrangement 23 and the centrifugal impellor 21 rotate at relatively low and high speeds in opposite directions and this at their interface where the admixed lining composition components leave the mixing chamber 27 and enter the centrifugal impellor 21 promotes a further advantageous mixing action on the lining composition.

The air supply to the air motors 52 is from the annular distribution chamber 41 along an axial annular passage 58 from the annular distribution air chamber 41 to air inlet pipes 59 for the air motors 52.

The air exhaust from the air motors 52 is via an annular axial passage 60 parallel with the air inlet passage 58 and spaced radially outwards therefrom as can readily be seen in FIGS. 6 and 7. The air outlet passage opens to atmosphere as indicated at 61 in the region of the air outlets of the air vane motors 38.

The method of lining an underground sewer or gas pipe employing the lining apparatus according to the present invention will now be described with particular reference to FIG. 9.

The equipment employed to line an underground sewer pipe 31 is diagrammatically shown in FIG. 9.

This equipment comprises, for example, a trailer 70 conveyed to the lining site by a suitable vehicle 71, the trailer 70 mounting a rotatable reel 72 on which are wound the prefilled lining composition hoses 73.

The equipment also comprises a second trailer 74 mounting a rotatable reel 75 on which is wound the air hose 39 suitably coupled in known manner as indicated at 76 to an air compressor 77.

This trailer 74 also mounts a winch 78 for a towing cable 79 coupled to the lining machine described above and in FIG. 9 generally indicated at 80. A trowelling arrangement to be described in detail later is coupled to the lining machine 80 and is generally indicated at 81.

The drives for the winch 78 and the reel 75 are not shown but these will be well known to those skilled in the art. Also a traversing laying mechanism for the air hose 39 is also not shown but again such mechanisms are well known to those skilled in the art.

In FIG. 9 the relative dispositions of the air hose 39, the towing wire 79 and the lining composition filled hoses 73 are shown incorrectly merely for convenience of illustration. In practice, the lining composition filled hoses 73 will be lowest, the towing wire 79 in the middle and the air hose 39 highest.

To line the sewer pipe 31 there is formed an "away" hole 82 leading to the sewer pipe 31 whereby the lining apparatus 80, 81 is introduced into the latter, and a "home" hole 83 through which the lining apparatus 80, 81 will eventually be removed.

The length of sewer pipe 31 to be lined is that which extends between the "away" hole 82 and the "home" hole 83, say for example 100 metres.

The sewer pipe 31, prior to lining, will have been pre-serviced including being cleaned and any rubble or accumulated rubbish removed therefrom. Also any necessary make-up to repair broken or collapsed sections of the sewer pipe will have been effected.

The pre-serviced length of sewer pipe 31 to be lined is sealed off from the rest of the sewer pipe by removable plugs 84, 85 disposed respectively upstream of the hole 82 and downstream of the hole 83.

The composition filled hoses 73 are fed down the hole 82, along the sewer pipe 31 and up the hole 83, the hoses 73 being laid parallel side-by-side and passing around radiussed guides 86, 87 respectively.

An adjustable tensioning device or winch 88 is disposed at ground level at the hole 82 and a similar device or winch 89 is mounted on the trailer 74 disposed at hole 83.

The lining machine 80, 81 is deposited in the sewer pipe 31 through the hole 82.

The prefilled plastic hoses 73 containing the component constituents of the lining composition (one resin, one hardener), and which are provided, at the filling stage, with empty tail lengths 73A, are laid along the length of the sewer pipe 31 to be lined, each hose 73 being anchored at each of its tail ends 73A by the winch or clamp devices 88, 89 to provide what is in effect a pair of parallel rails.

At the hole 82 the hose tails 73A are threaded through bore 20 of the lining machine. The filled hoses 73 at the hole 82 are fitted onto the ends of the delivery tubes 28, the hoses 73 from the delivery tubes 28 along their lengths to the hole 83 being filled with their respective lining composition component constituents save for the clamping tails 73A.

The air hose 39 is coupled to the appropriate air vane motor 38 by the quick-release coupling 40 and a pulling cable or wire 79 is secured by its yoke to the lateral plates or flanges 35. The air hose and pulling cable or wire are secured to their winches for pulling action thereof, the winches being suitably coupled together for simultaneous and synchronous rotational movement.

Upon operation of the winches the lining machine is advanced along the length of sewer pipe 31 to be lined, the motors 38 and 52 respectively being operational. The cutting blades 30 split the lining composition hoses and the content of the latter passes along the delivery tubes 28 into the mixing chamber 27 where for the first time the two components (resin and hardener) come together and are intimately mixed by the mixing and agitating arrangement 23, the mixed components flowing into the centrifugal impellor 21 for centrifugal application to the wall of the sewer pipe 31.

It is to be noted that the capacity of the lining composition hoses is such that the thickness of lining applied is predetermined.

The split and emptied hoses pass through the non-rotatable central tube 20 of the lining machine and may eventually fall in collapsed condition onto the floor of the lined sewer pipe 31 dependent upon the degree of tension imposed by the tensioning device 88 and the distance of the lining machine therefrom.

A lining as applied aforesaid is likely to have what is called an orange peel finish and it is preferred that this finish be removed to provide a completely or relatively completely smooth lining wall and for this purpose the trowelling arrangement 81 is provided (see FIG. 8).

The trowelling means employed with the trowelling arrangement comprises a flexible thin walled plastics tube 100.

The trowelling arrangement 81 comprises a radially expandible metal trowel 101 formed with overlapping leafs 102 as is well known to those skilled in the art. This trowel 101, 102 is of any convenient length. The trowel 101, 102 comprises an axial through-bore 103 defined by a tube 104 secured by ribs 105 to an inner wall 106 of the trowel 101, 102. The tube 104 and wall 106 define an annular housing or magazine 107 within which is packed in open tube form the trowelling tube 100. This generally will not be packed in orderly folded fashion as shown but merely be pushed into the housing 107 around the tube 104.

The housing 107 is open at its end 108 as indicated for egress of the trowelling tube 100. The trowel 101 is also open at its adjacent end as indicated at 109 and this open end 109 is surrounded by a plastics or other low friction material ring 110 to provide a smooth, snag-free run-out of the trowelling tube 100.

The trowelling arrangement 81 is secured to an extension tube 20A of the lining machine aligned with the bore 20 so that there is through the entire lining machine/trowelling arrangement assembly a central bore open at both ends for passage of the slit, emptied and flattened hoses 73. The tube 104 of the trowelling arrangement 81 is connected to the extension tube 20A of the lining machine by a releasable, double gimbal or other universal connection generally indicated at 111. The releasable connection is by way of a pull or rip cord or wire (not shown).

The pressure between the trowel leafs 102 and the lining 37 is effected by, and when necessary varied by, a tubular plastics foam wedge 112 axially movable between the leafs 102 and the inner wall 106.

Before commencement of the lining operation the flexible trowelling tube 100 is partly pulled out of the housing 107, is passed back over trowelling arrangement 81 and is anchored by a retention ring 113 at the hole 82.

As the lining machine 80 and trowelling arrangement 81 are advanced along the sewer pipe 31 to apply the lining the flexible trowelling tube egresses from the housing 107, passes back around the trowel 101, 102, and is applied against the lining 37 by the trowel 101, 102 thereby to remove the orange peel effect.

It will be manifest that the emptied flattened lining composition delivery hoses 73 pass through and fall out of the tube 104 onto the applied flexible trowelling tube.

When the lining and trowelling operation is completed and the lining machine 80 and trowelling arrangement 81 are removed up through the hole 83 the flexible trowelling tube 100 after an appropriate duration is released at its anchored end 113 and removed from the lined sewer together with the flattened emptied delivery hoses 73 which will also have had their anchored ends released.

The lining machine can then be cleaned by simply splitting the centrifugal impellor into its two halves and removing them for removal of the mixed lining composition component constituents. It is also to be noted that the casing 26 defining the exterior wall of the mixing chamber 27 is also capable of being diametrically split by release of two bolts 67 thereby permitting cleaning of the agitating arrangement 23 and the mixing chamber 27.

It will be manifest that it is not necessary to clean the delivery tubes 28 since each of these contains a separate component constituent of the lining composition, i.e. prior to mixing and consequently do not require to be cleaned.

It is also envisaged that no trowelling action may be required, the applied lining having a surface of a quality sufficiently good, i.e. sufficiently smooth for trowelling not to be needed, and, in this instance, the axially-split, emptied, flattened delivery hoses will simply fall out of the central tube 20 and ultimately onto the bottom of the lined pipe 31.

Transducers or sensors for measuring the rotational speed of the agitating and mixing arrangement and the centrifugal impellor are preferably fitted and are coupled via suitable cables or wires to tachometers disposed above ground at the "home" hole end so that the operator can see that both are operating at the required rotational speed.

The cables or wires connecting the transducers or sensors and the tachometers are contained within the air hose.

If television is provided to inspect the lining as it is being effected then the cable connecting the camera which would be mounted on the lining apparatus forwardly of the centrifugal impellor 21 and the visual display unit disposed above ground at the "home" hole end will also be contained within the air delivery hose.

I claim:

1. A method of lining a pipe comprising the steps of laying hose means along the bottom of a pipe to be lined, the hose means having been filled with a predetermined quantity of settable lining composition, anchoring the hose means at each end along the bottom of the pipe, advancing a centrifugal lining machine along the length of the hose means, slitting the hose means in front of the advancing centrifugal lining machine to permit egress of the lining composition from the hose means, delivering an admixed settable composition to a centrifugal impellor of the centrifugal lining machine for application of the settable composition to the pipe wall as the centrifugal lining machine advances along the pipe, and guiding the slit and emptied hose means through an axial bore in the centrifugal lining machine to lie in a flattened condition on the bottom of the lined pipe wall rearwardly of the centrifugal lining machine.

2. A method as claimed in claim 1, comprising laying a pair of hoses in parallel array along the bottom of the pipe, the hoses having been filled with a predetermined quantity of a respective component constituent of a two shot resinous settable lining composition, and separately guiding the lining composition components to a mixing chamber immediately forwardly of the centrifugal impellor.

3. A method as claimed in claim 2, comprising the step of trowelling or smoothing the applied lining composition by means of a tube of flexible thin-walled material housed in open tube manner in an annular housing surrounding an axial bore of a smoothing trowel trailed behind the centrifugal lining machine in terms of lining machine advancement, the two axial bores being aligned, and the trowelling action being effected by anchoring one end of the tube of flexible thin-walled material within the pipe at a location constituting a starting point for a pipe-lining run, advancing the centrifugal lining machine and smoothing trowel along the pipe to cause extraction of the flexible thin-walled tube through an open end of the annular housing adjacent the lining machine for movement around and rearwardly of the smoothing trowel which applies the flexible thin-walled tube under pressure against the applied lining composition rearwardly of the lining machine.

4. Apparatus for lining a pipe with a settable lining composition contained in hose means laid along the pipe, the apparatus being adapted to be advanced through the pipe and comprising a centrifugal lining machine having an axial bore extending the length thereof, inlet means for the settable lining composition, delivery tube means connected, at one end, to the inlet means and adapted, at the other end, for insertion into the hose means filled with the settable lining composition, and hose-slitting means at or adjacent the other end of the delivery tube means for axially slitting the hose means as the delivery tube means is urged into the hose means, whereby the settable lining composition can flow from the hose means into the delivery tube means and thence to the centrifugal lining machine, while the slit and emptied hoses pass through the axial bore to be disposed on the now-lined wall of the pipe.

5. Apparatus as claimed in claim 4, in which the delivery tube means comprises a pair of delivery tubes, each for a respective component constituent of a two-shot resinous settable lining composition, communicating with a mixing chamber containing a rotatable mixing and agitating arrangement, which chamber, in turn, communicates with a centrifugal impellor of the centrifugal lining machine, the mixing and agitating arrangement and the centrifugal impellor being rotated in opposite directions at different speeds by separate driving means.

6. Apparatus as claimed in claim 5, in which the centrifugal impellor is driven at a relatively high speed while the mixing and agitating arrangement is driven at a relatively low speed.

7. Apparatus as claimed in claim 5, in which the driving means for the centrifugal impellor and the mixing and agitating arrangement respectively comprises a plurality of air vane motors coupled to the centrifugal impellor and the mixing and agitating arrangement respectively via gearing, the respective air vane motors being at opposite ends of the centrifugal lining machine.

8. Apparatus as claimed in claim 7, in which motive air pressure is fed to the air vane motors of the mixing and agitating arrangement via an air delivery hose or pipe and an annular distribution chamber which communicates with an axial annular chamber to deliver pressurised air to the air vane motors driving the centrifugal impellor.

9. Apparatus as claimed in claim 8, in which exhaust air from the centrifugal impellor air vane motors is returned via an axial annular chamber concentric with the air delivery axial annular chamber for exhaust at the leading end of the centrifugal lining machine.

10. Apparatus as claimed in claim 1 in which a smoothing trowel is connected to the rear of the lining machine and comprises an axial bore aligned with the axial bore of the lining machine and surrounded by an annular housing for containing in open tube manner a tube of flexible thin-walled material, the annular housing being open at its end nearer the lining machine for egress of the flexible thin-walled tube.

* * * * *